(12) United States Patent
Allen

(10) Patent No.: US 6,488,977 B1
(45) Date of Patent: Dec. 3, 2002

(54) GREASE ABSORBING SYSTEM

(76) Inventor: Gary L. Allen, 213 Gunion Ave., Pekin, IL (US) 61554

( * ) Notice: Subject to any disclaimer, the term of this patent is extended or adjusted under 35 U.S.C. 154(b) by 0 days.

(21) Appl. No.: 10/036,183

(22) Filed: Dec. 26, 2001

Related U.S. Application Data

(63) Continuation-in-part of application No. 09/591,061, filed on Jun. 9, 2000, now Pat. No. 6,342,263.

(51) Int. Cl.⁷ .................................................. A23L 1/00
(52) U.S. Cl. ................................ 426/523; 210/DIG. 8; 426/417
(58) Field of Search ................................ 426/523, 417, 426/438; 210/922, DIG. 8

(56) References Cited

U.S. PATENT DOCUMENTS

| | | |
|---|---|---|
| 3,127,828 A | 4/1964 | Fine |
| 3,209,978 A | 10/1965 | Dupuis |
| 3,415,662 A | 12/1968 | Koger et al. |
| 3,613,555 A | 10/1971 | Ogman |
| 4,950,524 A | 8/1990 | Hacker |
| 5,093,176 A | 3/1992 | Pribonic et al. |
| D395,715 S | 6/1998 | Queen |
| 5,814,396 A | 9/1998 | Weidner et al. |

*Primary Examiner*—George C. Yeung

(57) ABSTRACT

A grease absorbing system for disposing of excess cooking grease or used cooking oil includes a grease absorbing member. In embodiments of the invention the grease absorbing member comprises an inner portion constructed of a grease absorbent material and an exterior layer enveloping the inner portion or a pair of exterior layers on either side of a plurality of medial layers. The exterior layer or layers are constructed of a grease permeable material for permitting grease to permeate through the exterior layer and into the inner portion or medial layers.

20 Claims, 7 Drawing Sheets

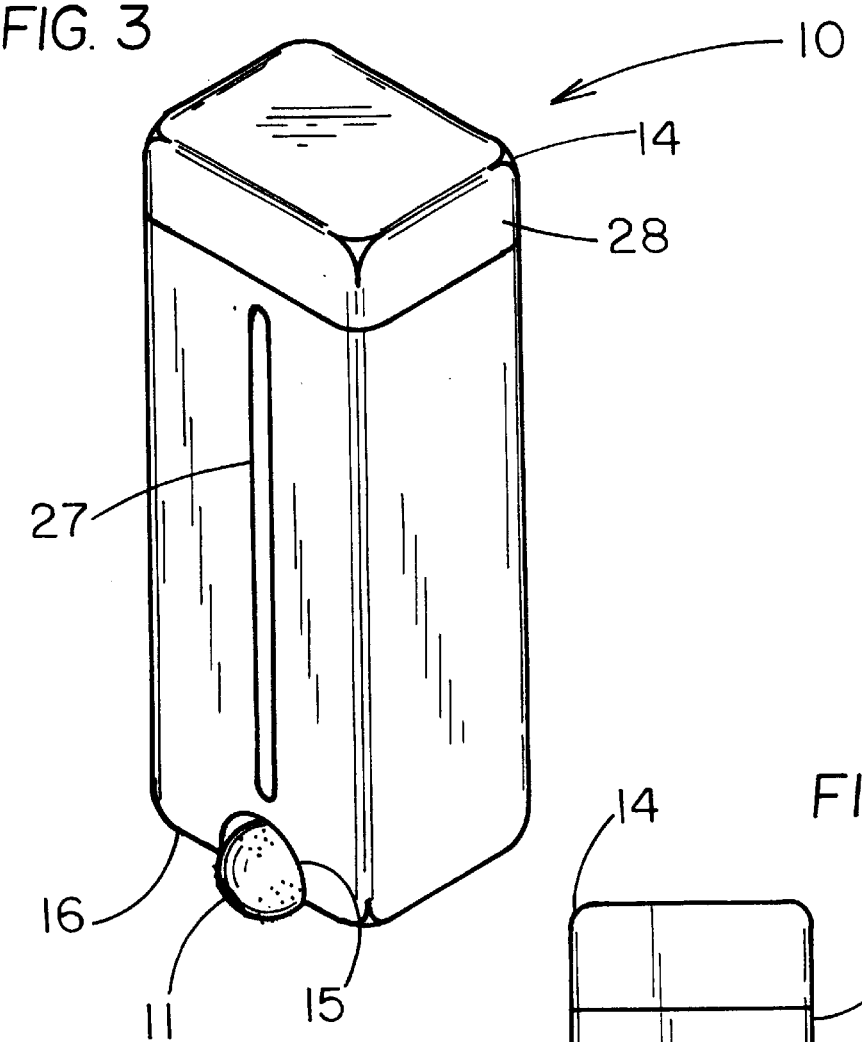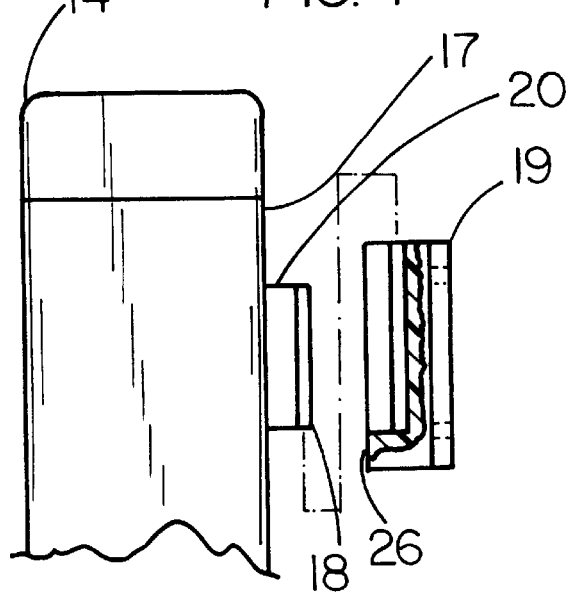

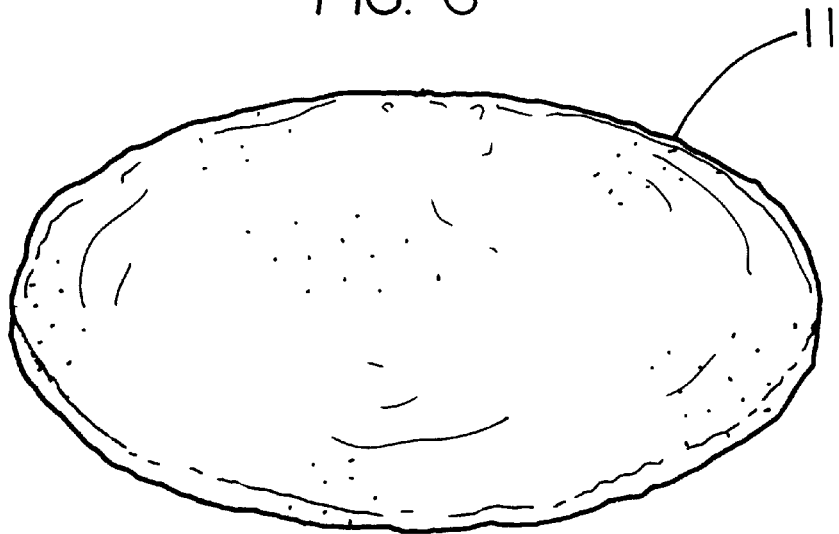
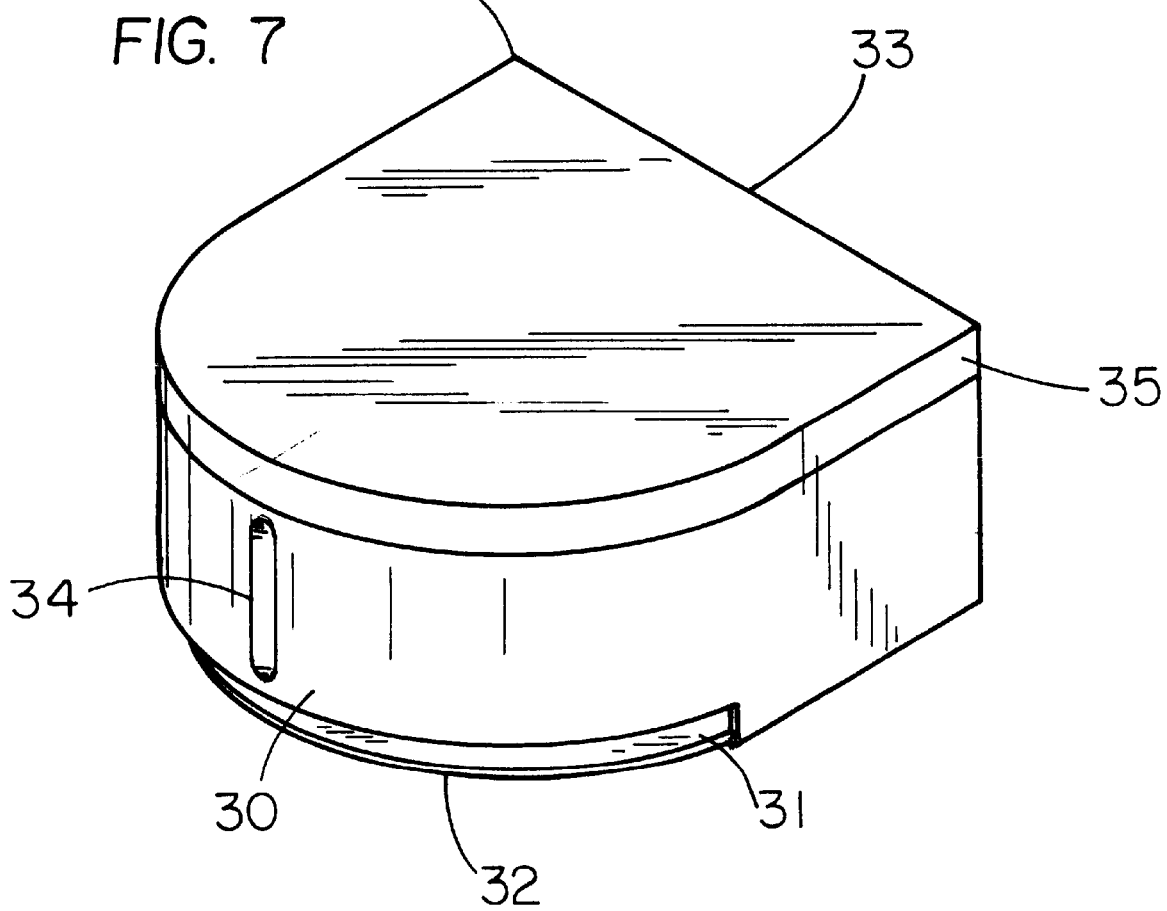

GREASE ABSORBING SYSTEM

RELATED APPLICATIONS

The present application is a continuation in part of application Ser. No. 09/591,061 filed Jun. 9, 2000, now U.S. Pat. No. 6,342,263.

BACKGROUND OF THE INVENTION

1. Field of the Invention

The present invention relates to disposable cooking grease traps and more particularly pertains to a new grease absorbing system for providing a system for disposing of excess cooking grease.

2. Description of the Prior Art

The use of disposable cooking grease traps is known in the prior art. More specifically, disposable cooking grease traps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,814,396; U.S. Pat. No. 3,613,555; U.S. Pat. No. 4,950,524; U.S. Pat. No. 5,093,176; U.S. Pat. No. 3,209,978; U.S. Pat. No. 3,127,828; U.S. Pat. No. 3,415,662; and U.S. Pat. No. Des. 395,715.

While these devices fulfill their respective, particular objectives and requirements, the aforementioned patents do not disclose a new grease absorbing system. The inventive device includes a grease absorbing member. The grease absorbing member comprises an inner portion constructed of a grease absorbent material and an exterior layer enveloping the inner portion. The exterior layer is constructed of a grease permeable material for permitting grease to permeate through the exterior layer and into the inner portion.

In these respects, the grease absorbing system according to the present invention substantially departs from the conventional concepts and designs of the prior art, and in so doing provides an apparatus primarily developed for the purpose of providing a system for disposing of excess cooking grease.

SUMMARY OF THE INVENTION

In view of the foregoing disadvantages inherent in the known types of disposable cooking grease traps now present in the prior art, the present invention provides a new grease absorbing system construction wherein the same can be utilized for providing a system for disposing of excess cooking grease.

The general purpose of the present invention, which will be described subsequently in greater detail, is to provide a new grease absorbing system apparatus and method which has many of the advantages of the disposable cooking grease traps mentioned heretofore and many novel features that result in a new grease absorbing system which is not anticipated, rendered obvious, suggested, or even implied by any of the prior art disposable cooking grease traps, either alone or in any combination thereof.

To attain this, the present invention generally comprises a grease absorbing member. The grease absorbing member comprises an inner portion constructed of a grease absorbent material and an exterior layer enveloping the inner portion. The exterior layer is constructed of a grease permeable material for permitting grease to permeate through the exterior layer and into the inner portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new grease absorbing system apparatus and method which has many of the advantages of the disposable cooking grease traps mentioned heretofore and many novel features that result in a new grease absorbing system which is not anticipated, rendered obvious, suggested, or even implied by any of the prior art disposable cooking grease traps, either alone or in any combination thereof.

It is another object of the present invention to provide a new grease absorbing system which may be easily and efficiently manufactured and marketed.

It is a further object of the present invention to provide a new grease absorbing system which is of a durable and reliable construction.

An even further object of the present invention is to provide a new grease absorbing system which is susceptible of a low cost of manufacture with regard to both materials and labor, and which accordingly is then susceptible of low prices of sale to the consuming public, thereby making such grease absorbing system economically available to the buying public.

Still yet another object of the present invention is to provide a new grease absorbing system which provides in the apparatuses and methods of the prior art some of the advantages thereof, while simultaneously overcoming some of the disadvantages normally associated therewith.

Still another object of the present invention is to provide a new grease absorbing system for providing a system for disposing of excess cooking grease.

Yet another object of the present invention is to provide a new grease absorbing system which includes a grease absorbing member. The grease absorbing member comprises an inner portion constructed of a grease absorbent material and an exterior layer enveloping the inner portion. The exterior layer is constructed of a grease permeable material for permitting grease to permeate through the exterior layer and into the inner portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the housing of the present invention.

FIG. 4 is an elevational partial cross-sectional view of the connection member and bracket member of the present invention.

FIG. 6 is a perspective view of an alternate embodiment of the present invention.

FIG. 7 is a perspective view of the housing of the alternate embodiment of the present invention.

DESCRIPTION OF THE PREFERRED EMBODIMENT

Figure 1:
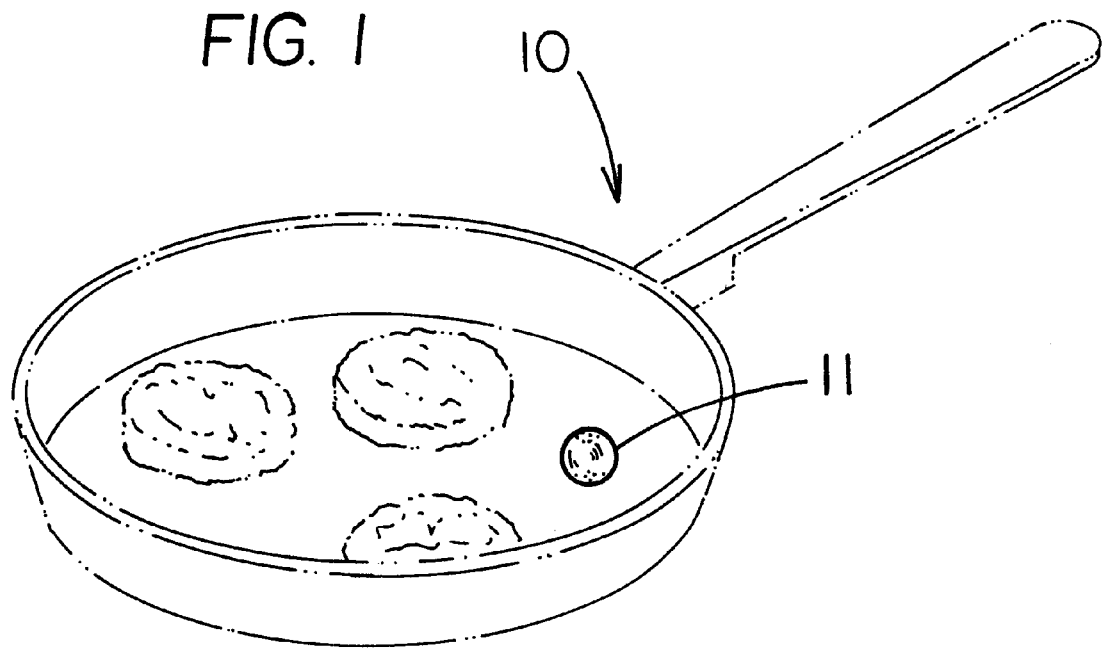
FIG. 1 is a perspective view of a new grease absorbing system according to the present invention shown in use.
Figure 2:
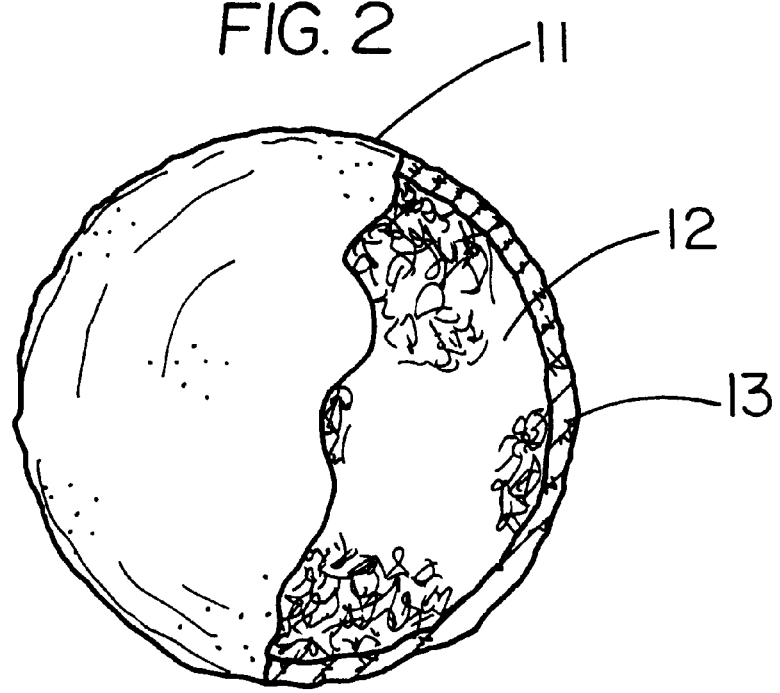
FIG. 2 is a partial cross-sectional view of the present invention.
Figure 5:
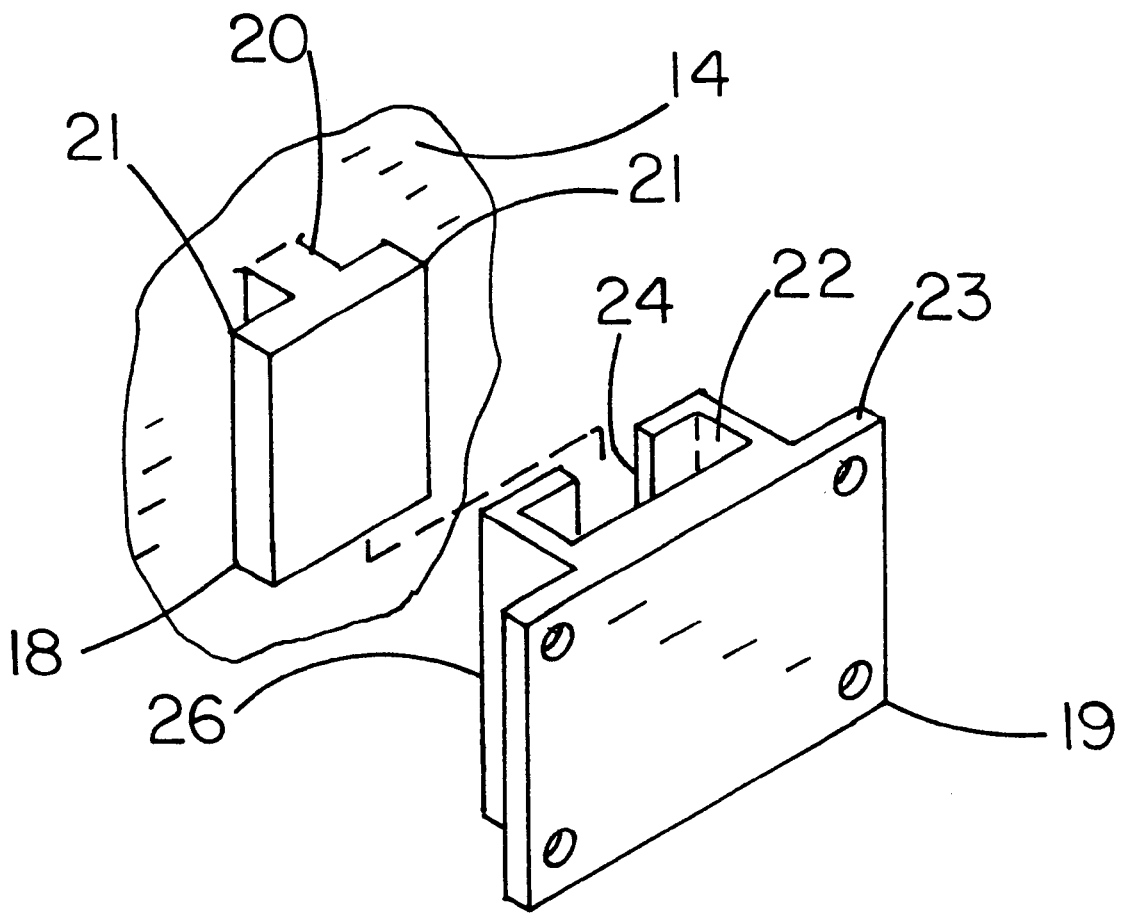
FIG. 5 is a perspective view of the connection member and bracket member of the present invention.

With reference now to the drawings, and in particular to FIGS. 1 through 10 thereof, a new grease absorbing system embodying the principles and concepts of the present invention and generally designated by the reference numeral 10 will be described.

As best illustrated in FIGS. 1 through 10, the grease absorbing system 10 generally comprises a grease absorbing member 11. In an embodiment, the grease absorbing member 11 has a pair of exterior layers 52 and a plurality of medial layers 54 positioned between the exterior layers 52. The exterior layers 52 are constructed of a grease permeable material for permitting grease to permeate through the exterior layers 52 and into the medial layers 54. The exterior layers 52 and medial layers 54 form a planar shape designed for covering a bottom cooking area of a pan when the grease absorbing member is placed in the pan for facilitating absorption of grease collected in the pan during cooking. The exterior layers 54 may be of the same material as the interior layers, specifically milled fluff pulp, or of a different grease and oil permeable material such as those described more fully below.

In an embodiment, an single exterior layer 13 envelopes an interior layer 12 and holds the interior layer 12 generally in the shape of a sphere for permitting the grease absorbing member to roll in a pan to a lowermost portion of the pan whereby the grease absorbing member is designed for absorbing grease from the lowermost point of the pan where grease naturally collects during cooking. Testing has proven that the interior layer of the grease absorbing member may comprise the material found in the absorption layer of a diaper as the absorption layer of the diaper displays excellent characteristics for absorbing the grease from a pan.

A housing 14 holds a plurality of the grease absorbing members. The housing comprises an opening 15 on a leading bottom edge 16 of the housing for permitting passing of one of the plurality of the grease absorbing members through the opening. The opening comprises a width slightly less than a diameter of each the grease absorbing member whereby each the grease absorbing member is prevented from freely passing through the opening. Each grease absorbing member is compressible whereby each grease absorbing member may be pulled through the opening when the grease absorbing member is grasped by a user and pulled away from the housing.

The housing comprises a back face 17. A connection member 18 is coupled to the back face of the housing. A bracket member 19 is designed for coupling to a support surface. The connection member is selectively couplable to the bracket member for coupling the dispenser to the support surface. The connection member comprises a generally T-shaped cross-section. A central flange 20 of the connection member is coupled to the back face of the housing and a distal flange 21 of the connection member is positioned to extend substantially parallel to the back face of the housing.

The bracket member comprises an interior slot 22 extending downwardly from a top 23 of the bracket member. The interior slot is for receiving the distal flange of the connection member. The bracket member further comprises a second slot 24 extending downwardly from the top of the bracket member. The slot extends between the interior slot and a front 26 of the bracket member such that the second slot receives the central flange of the connection member when the connection member is coupled to the bracket member.

The housing comprises a viewing slot 27 extending generally vertically upwards from the opening for permitting visual inspection of a level of grease absorbing members held in the housing whereby a user may visually determine when additional grease absorbing members should be added to the housing to prevent running out of the grease absorbing members. The housing comprises an openable top 28 for permitting filling of the housing with the grease absorbing members.

Figure 8:
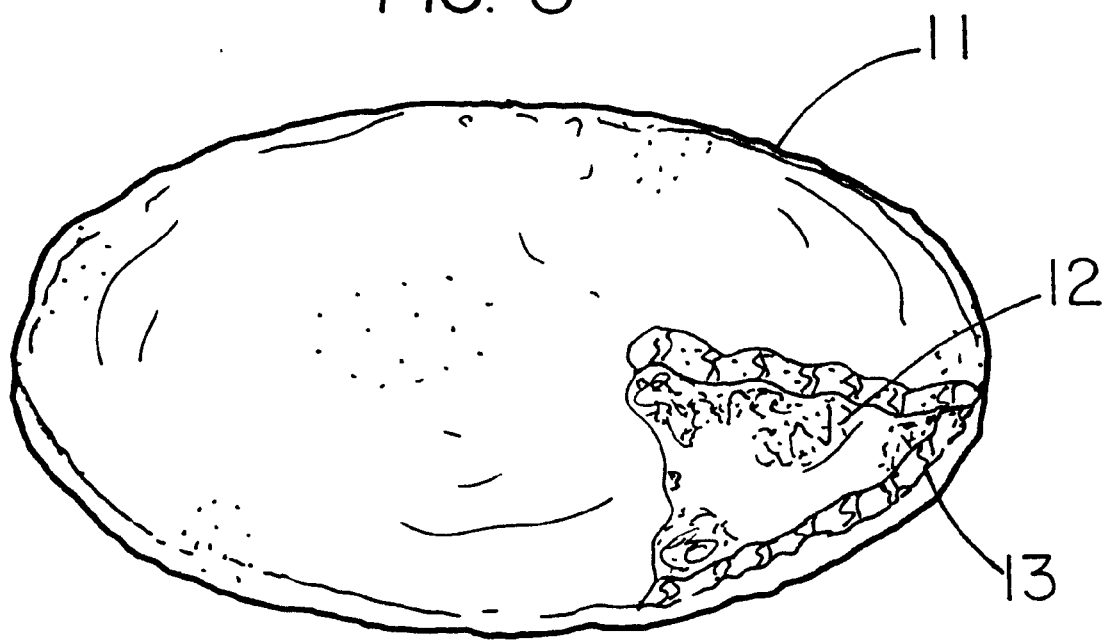
FIG. 8 is a perspective partial cross-sectional view of the alternate embodiment of the present invention.
Figure 9:
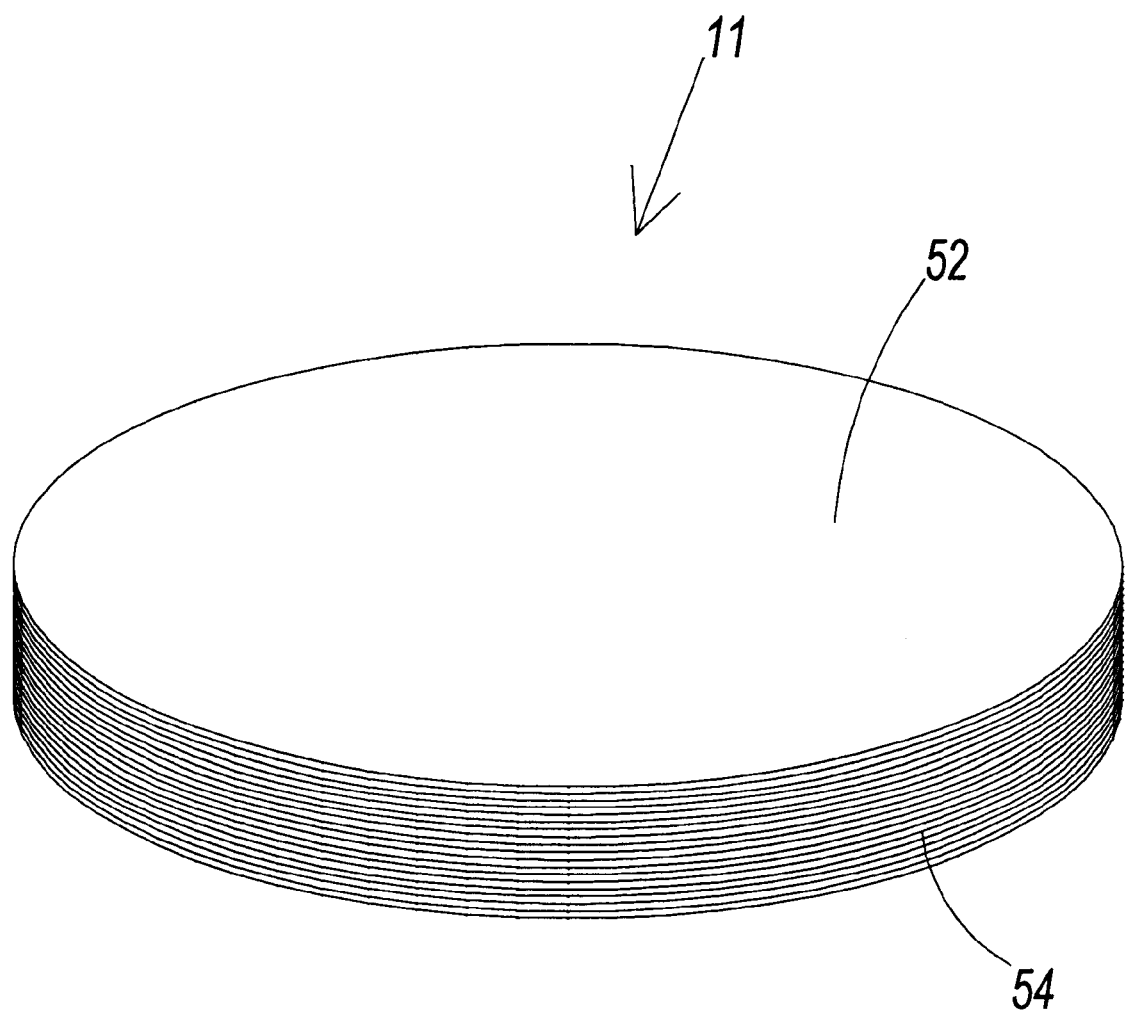
FIG. 9 is a perspective view of an alternate embodiment of the present invention.
Figure 10:
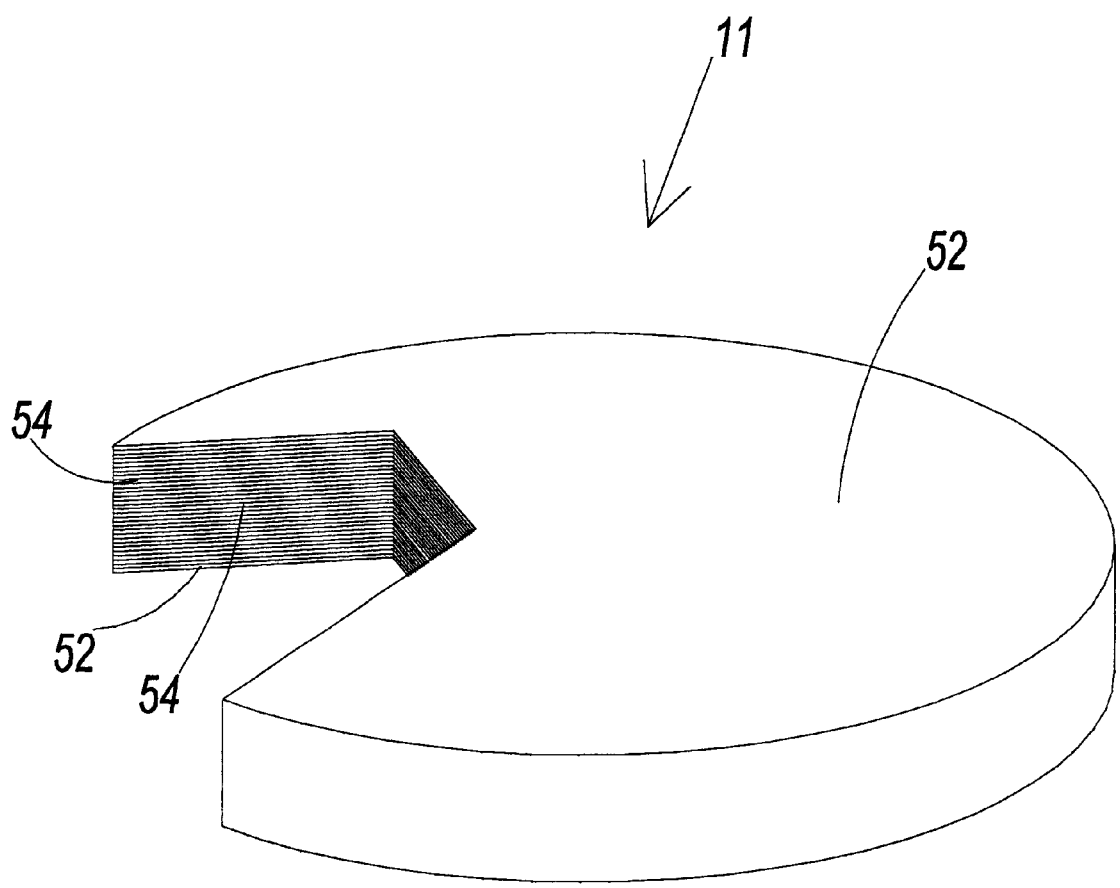
FIG. 10 is a perspective partial cross-sectional view of the alternate embodiment of the present invention.

In an embodiment, as shown in FIGS. 6 through 8, the exterior layer of the grease absorbing member generally holds the inner portion in a shape of a disk adapted for covering a bottom cooking area of a pan when the grease absorbing member is placed in the pan for facilitating absorption of grease collected in the pan during cooking. The disk shaped grease absorbing member has a diameter between about 8 inches and about 10 inches. Testing has proven that the interior layer of the grease absorbing member may comprise either milled fluff pulp or the material found in the absorption layer of a diaper as the absorption layer of the diaper displays excellent characteristics for absorbing the grease from a pan.

A housing 29 is for holding a plurality of the grease absorbing members. The housing comprises an arcuate forward face 30. The housing comprises an arcuate opening 31 extending along a leading bottom edge 32 of the housing such that a stack of the grease absorbing members is supportable on a bottom of the housing. The opening is for permitting passing of one of the plurality of the grease absorbing members forwardly through the opening when an edge of the one grease absorbing member is grasped by a user. The opening comprises a width slightly less than a diameter of each the grease absorbing member whereby each the grease absorbing member is prevented from freely passing through the opening. Each grease absorbing member is compressible whereby each grease absorbing member may be pulled through the opening when the grease absorbing member is grasped by the a user and pulled forwardly away from the housing.

The housing comprises a planar back face 33. A connection member is coupled to the back face of the housing. A bracket member is adapted for coupling to a support surface. The connection member is selectively couplable to the bracket member for coupling the dispenser to the support surface. The connection member and the bracket member of this embodiment has structure that is similar to that the original embodiment.

The housing comprises a viewing slot 34 extending generally vertically upwards from the opening for permitting visual inspection of a level of grease absorbing members held in the housing whereby a user may visually determine when additional grease absorbing members should be added to the housing to prevent running out of the grease absorbing members. The housing comprises an openable top 35 for permitting filling of the housing with the grease absorbing members.

The housing 29 is also used for dispensing the grease absorbing member utilizing the exterior layers 52 and medial layers 54 formed into a planar shape.

In use, a generally spherical grease absorbing member is provided. A meat product is placed into a pan and heated whereby grease is produced. The spherical grease absorbing member is placed into the pan while the meat product is heated whereby the spherical grease absorbing member absorbs the grease during heating of the meat product to reduce splattering of the grease during cooking. The meat product is removed after heating. The spherical grease absorbing member is removed from the pan. The spherical grease absorbing member is then disposed.

In an embodiment, a disk-shaped grease absorbing member is provided. The disk-shaped grease absorbing member may be of either the stacked layers 52 and 54 of the first embodiment or the single exterior layer 13 enveloping an inner layer 12. A meat product is placed into a pan and heated to cook the meat product whereby grease is produced. The meat product is removed from the pan after heating. The disk-shaped grease absorbing member is placed into the pan whereby the grease is absorbed into the grease absorbing member. The grease absorbing member is then disposed.

Alternately, oil may be placed into the pan for cooking non-meat or low fat meats. The grease absorbing member may be placed into the pan before or after removing the food from the pan to absorb the oil and/or grease in the pan.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of absorbing grease during cooking, the steps of the method comprising:

providing a grease absorbing member, said grease absorbing member having a pair of exterior layers and a plurality of medial layers positioned between said pair of exterior layers, said pair of exterior layers being constructed of a grease permeable material for permitting grease to permeate through said pair of exterior layers and into said plurality of medial layers;

placing a meat product into a pan and heating said meat product whereby grease is produced from said meat product;

removing said meat product after heating;

placing said grease absorbing member into said pan whereby said grease is absorbed into said grease absorbing member; and disposing of said grease absorbing member.

2. The method of claim 1 wherein said grease absorbing member is generally planar for covering a bottom surface of said pan.

3. The method of claim 2 wherein said grease absorbing member is generally disk-shaped for covering a generally circular bottom surface of said pan.

4. A method of absorbing grease during cooking, the steps of the method comprising:

providing a grease absorbing member, said grease absorbing member having a pair of exterior layers and a plurality of medial layers positioned between said pair of exterior layers, said pair of exterior layers being constructed of a grease permeable material for permitting grease to permeate through said pair of exterior layers and into said plurality of medial layers;

placing a quantity of oil into a pan;

heating said quantity of oil in said pan;

placing a food item in said heated oil so as to cook said food item;

placing said grease absorbing member into said pan whereby said oil is absorbed into said grease absorbing member; and disposing of said grease absorbing member.

5. A method of absorbing oily matter from cooking, comprising:

providing an absorbing member having a pair of exterior layers and a plurality of medial layers positioned between said pair of exterior layers, said pair of exterior layers being constructed of a permeable material for permitting oily matter to permeate through said pair of exterior layers and into said plurality of medial layers;

placing a food product into a pan;

heating said food product so as to cook said food product;

positioning said absorbing member into said pan;

absorbing oily matter from said pan by said absorbing member; and disposing of said absorbing member.

6. The method of claim 5 including producing said oily matter by said step of heating said food product.

7. The method of claim 5 including removing said food product from said pan.

8. The method of claim 7 wherein said step of positioning said absorbing member occurs before said step of removing said food product from said pan.

9. The method of claim 7 wherein said step of positioning said absorbing member occurs after said step of removing said food product from said pan.

10. The method of claim 5 including the step of adding oil to said pan for heating said food product.

11. The method of claim 5 wherein said step of providing said absorbing member includes providing said absorbing member with a generally planar surface for positioning against a bottom surface in said pan.

12. The method of claim 5 wherein said step of providing said absorbing member includes providing said absorbing member with a pair of generally planar opposite surfaces for positioning against a bottom surface in said pan.

13. The method of claim 5 wherein said step of providing said absorbing member includes providing said absorbing member with a circular perimeter for positioning against a generally circular bottom surface in said pan.

14. The method of claim 5 wherein said step of providing said absorbing member includes forming said exterior layers and said medial layers of an absorptive material capable of absorbing oily material.

15. The method of claim 5 wherein said step of providing said absorbing member includes forming said exterior layers and said medial layers of milled fluff pulp.

16. The method of claim 5 including providing a housing for holding a plurality of said absorbing members.

17. The method of claim 16 wherein the step of providing said housing includes providing an opening on a leading bottom edge of said housing for permitting passing of one of said plurality of said absorbing members through said opening.

18. The method of claim 16 wherein said step of providing said housing includes providing connecting means on said housing for removably connecting said housing to a support surface.

19. The method claim 17 wherein said step of providing said housing includes providing a viewing slot on said housing extending generally vertically upwards from said opening for permitting visual inspection of a quantity of absorbing members held in said housing such that a user may visually determine the quantity of said absorbing members in said housing.

20. The method of claim 16 wherein said step of providing said housing includes providing an openable top on said housing for permitting filling of said housing with said absorbing members.

* * * * *